(No Model.)
G. BURNHAM, Jr.
MACHINE FOR COOKING CORN.
No. 503,577.  Patented Aug. 22, 1893.
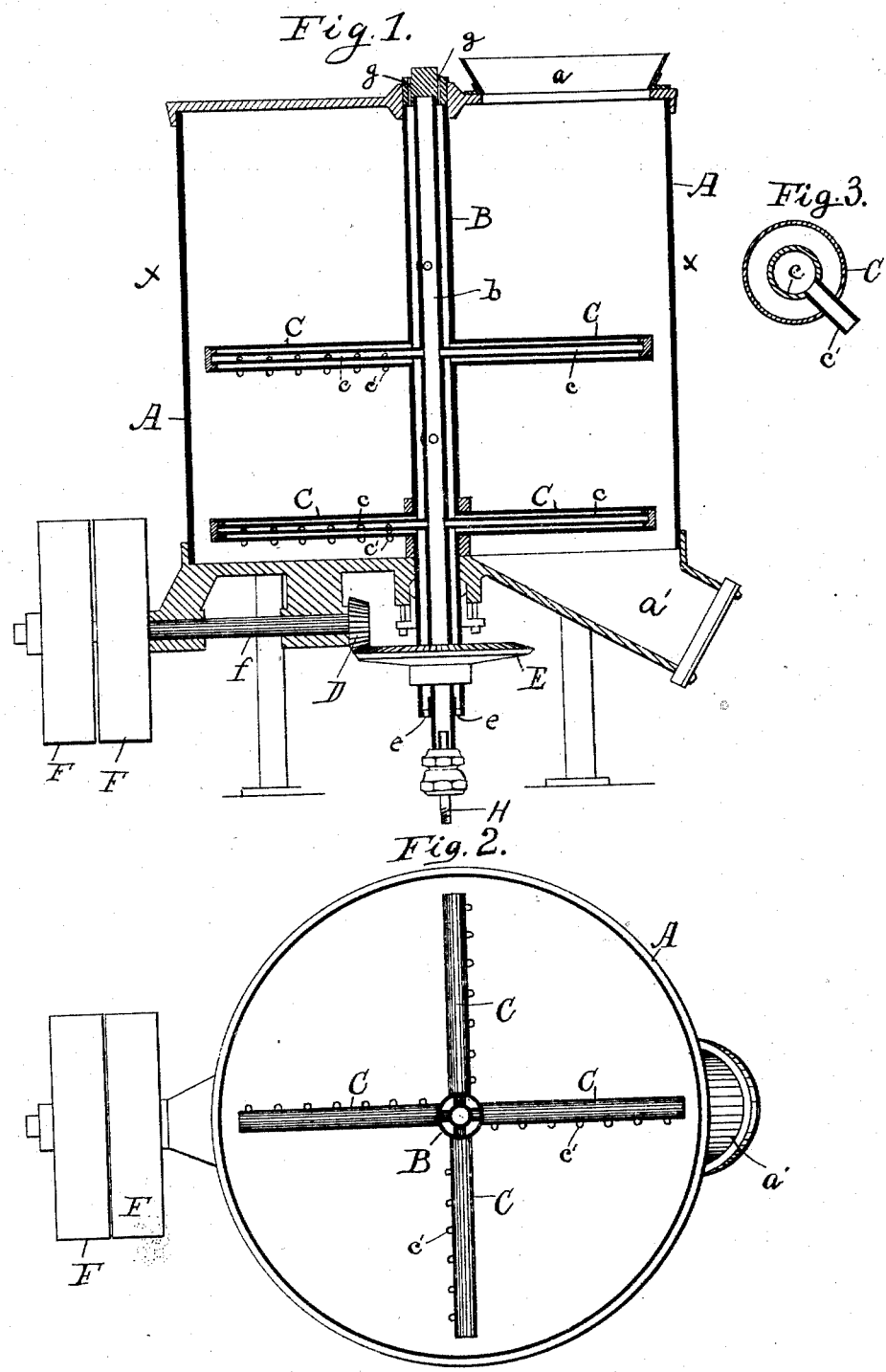
Witnesses:
F. E. Barbour
E. H. Mosley
Inventor:
George Burnham Jr.
by S. M. Bates his Atty.

UNITED STATES PATENT OFFICE.

GEORGE BURNHAM, JR., OF PORTLAND, MAINE.

MACHINE FOR COOKING CORN.

SPECIFICATION forming part of Letters Patent No. 503,577, dated August 22, 1893.

Application filed April 24, 1893. Serial No. 471,582. (No model.)

*To all whom it may concern:*

Be it known that I, GEORGE BURNHAM, Jr., a citizen of the United States, residing at Portland, in the county of Cumberland and State of Maine, have invented certain new and useful Improvements in Machines for Cooking Corn, &c.; and I do hereby declare the following to be a full, clear, and exact description of the invention, such as will enable others skilled in the art to which it appertains to make and use the same.

My invention relates to a machine for cooking fruit, vegetables, &c., preparatory to canning the same and it is particularly adapted to the cooking of green corn. Hitherto green corn has been cooked for canning chiefly by stirring or agitating it in a hopper or other receptacle by means of a hollow stirrer heated by steam, jets of steam being injected into the mass of corn in some cases and in others reliance being placed alone on the steam heated surfaces of the stirrers. When corn or other starchy material is cooked in this form of apparatus, that portion which comes in immediate contact with the hot surfaces of the stirrers dries and adheres forming hard scales which fall off into the corn and greatly injure its quality. This scale adhering to the surfaces of the stirrer renders it difficult to clean and to keep clean and this fact greatly impairs its usefulness for canning corn. I remedy these difficulties according to my present invention, by insulating the exposed surfaces of the stirrer so as to prevent them from becoming unduly heated. The starch is thus prevented from drying on and coating the surfaces of the stirrer, the latter is easily kept clean and no dried scales are found in the corn after the same has been canned.

I have illustrated my invention by means of the accompanying drawings in which Figure 1 is a central vertical section. Fig. 2 is a section on $x\ x$ of Fig. 1. Fig. 3 is a cross section of one of the stirrer arms.

A represents a suitable vessel or hopper having an opening $a$ at the top for introducing the material to be cooked and a suitable discharge opening $a'$ at the bottom. The stirrer herein shown is a rotary stirrer having a central hub with radial arms. The hub is made up of an exterior pipe or casing B from which extend radial arms C. The pipe B is journaled as here shown at both the upper and lower ends, the lower end extending through the bottom of the hopper. It is rotated by means of a driving gear D which engages a gear E secured to the lower end of the pipe B. F F are the driving pulleys and $f$ is the driving shaft. Within the arms C are steam pipes $c$ connecting with a central steam pipe $b$ within the vertical pipe B. Between the steam pipes and the casings is an air space through which a circulation of air is maintained by means of air openings $e\ e$ connecting with the air space at the lower end of the pipe B and openings $g\ g$ at the upper end. Nipples $c'$ extend at intervals through the pipes $c$ and $c$ for discharging steam from the arms into the mass of corn. They point downward and backward at an angle of forty-five degrees as herein shown. A steam pipe H is provided for supplying steam to the lower end of the pipe $b$ and this pipe is designed to be connected with some suitable source of supply.

I have herein described my cooker as I prefer to construct it but it is evident that the surfaces of the stirrer may be insulated from the internal heat by other means than the air space herein described and the apparatus may be otherwise modified without departing from the spirit of my invention. As already pointed out, it may be applied to other substances besides corn which tend to coagulate and dry on to the surface of the heated stirrer.

I claim—

1. In a machine for cooking corn and other like substances the combination of a hopper a hollow stirrer therein, means for supplying steam to said stirrer having openings for the discharge of steam and having its outer surfaces insulated from its interior, substantially as described.

2. In a machine for cooking corn &c. the combination of a hopper, a stirrer therein having arms or beaters composed of an interior steam pipe an exterior casing surrounding said steam pipe the two parts being separated by an insulating space and ducts for discharging steam from the interior of said arms, substantially as described.

3. In a machine for cooking corn &c. the combination of a hopper a stirrer therein consisting of a rotating steam pipe with radial pipes therewith, an outer casing for said pipes separated therefrom by an air space, air inlets at the lower portion of said air space and air discharge openings at the upper portion thereof and ducts for discharging steam from the interior steam pipes, substantially as described.

GEORGE BURNHAM, JR.

In presence of—
 E. DUDLEY FREEMAN,
 HELEN N. BATES.